US007655927B2

(12) United States Patent
Sakurai et al.

(10) Patent No.: US 7,655,927 B2
(45) Date of Patent: Feb. 2, 2010

(54) RADIATION IMAGE CONVERTING PANEL

(75) Inventors: Jun Sakurai, Hamamatsu (JP); Ichinobu Shimizu, Hamamatsu (JP); Gouji Kamimura, Hamamatsu (JP)

(73) Assignee: Hamamatsu Photonics K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 12/350,535

(22) Filed: Jan. 8, 2009

(65) Prior Publication Data

US 2009/0261274 A1 Oct. 22, 2009

(30) Foreign Application Priority Data

Apr. 21, 2008 (JP) ........................... P2008-110374

(51) Int. Cl.
*G03B 42/08* (2006.01)

(52) U.S. Cl. ................................................... 250/484.4

(58) Field of Classification Search ............ 250/370.09, 250/370.11, 483.1, 484.4; 378/98.8
See application file for complete search history.

(56) References Cited

FOREIGN PATENT DOCUMENTS

| | | |
|---|---|---|
| EP | 1516905 A2 * | 3/2005 |
| JP | 2-58000 | 2/1990 |
| JP | 2005-98717 | 4/2005 |

* cited by examiner

*Primary Examiner*—David P Porta
*Assistant Examiner*—Mark R Gaworecki
(74) *Attorney, Agent, or Firm*—Drinker Biddle & Reath LLP

(57) ABSTRACT

The present invention relates to a radiation image converting panel with a structure to realize an improvement in moisture resistance in the periphery of the panel. The radiation image converting panel comprises a support body and a radiation converting film formed on the support body. The radiation converting film is formed on a film forming region which exists within a first main surface of the support body and includes at least a gravity center position of the first main surface. An average crystal diameter of columnar crystals located on a peripheral measuring area of the film forming region is controlled to be 1.3 times or more larger than an average crystal diameter of columnar crystals located on a central measuring area corresponding to a gravity center position of the film forming region, whereby moisture resistance in the periphery of the panel is improved, so that a sufficient fluorescence lifetime of the panel as a whole is maintained.

12 Claims, 9 Drawing Sheets

D1=APPROXIMATELY 4 μm

D2=APPROXIMATELY 6 μm

D3=APPROXIMATELY 10 μm

Fig.6

| MEASURING POSITION | DISTANCE W FROM GRAVITY CENTER POSITION |
|---|---|
| $\phi$0 | 0%(=$W_0$) |
| $\phi$150 | 30%(=$W_{0.3}$) |
| $\phi$200 | 40%(=$W_{0.4}$) |
| $\phi$250 | 50%(=$W_{0.5}$) |
| $\phi$300 | 60%(=$W_{0.6}$) |
| $\phi$450 | 90%(=$W_{0.9}$) |

($W_{min}$=1)

Fig.7A

<SAMPLE NO.1>

| MEASURING POSITION | NUMBER OF CRYSTALS | | | AVERAGE NUMBER | CRYSTAL DIAMETER D(μm) | CRYSTAL DIAMETER RATIO |
|---|---|---|---|---|---|---|
| | L1 | L2 | L3 | | | |
| φ0 | 29 | 31 | 30 | 30 | 4.0 | 1.00 |
| φ150 | 24 | 25 | 26 | 25 | 4.8 | 1.20 |
| φ200 | 23 | 21 | 22 | 22 | 5.4 | 1.36 |
| φ250 | 22 | 21 | 19 | 21 | 5.7 | 1.45 |
| φ300 | 23 | 20 | 20 | 21 | 5.7 | 1.43 |
| φ450 | 19 | 22 | 24 | 22 | 5.5 | 1.38 |

Fig.7B

<SAMPLE NO.2>

| MEASURING POSITION | NUMBER OF CRYSTALS | | | AVERAGE NUMBER | CRYSTAL DIAMETER D(μm) | CRYSTAL DIAMETER RATIO |
|---|---|---|---|---|---|---|
| | L1 | L2 | L3 | | | |
| φ0 | 35 | 30 | 30 | 32 | 3.8 | 1.00 |
| φ150 | 29 | 28 | 26 | 28 | 4.3 | 1.14 |
| φ200 | 24 | 25 | 24 | 24 | 4.9 | 1.30 |
| φ250 | 23 | 19 | 19 | 20 | 5.8 | 1.56 |
| φ300 | 20 | 21 | 19 | 20 | 5.9 | 1.58 |
| φ450 | 21 | 22 | 20 | 21 | 5.7 | 1.51 |

Fig.7C

<SAMPLE NO.3>

| MEASURING POSITION | NUMBER OF CRYSTALS | | | AVERAGE NUMBER | CRYSTAL DIAMETER D(μm) | CRYSTAL DIAMETER RATIO |
|---|---|---|---|---|---|---|
| | L1 | L2 | L3 | | | |
| φ0 | 29 | 27 | 27 | 28 | 4.3 | 1.00 |
| φ150 | 27 | 26 | 27 | 27 | 4.5 | 1.04 |
| φ200 | 27 | 26 | 24 | 26 | 4.6 | 1.08 |
| φ250 | 23 | 24 | 26 | 24 | 4.9 | 1.14 |
| φ300 | 22 | 22 | 19 | 21 | 5.7 | 1.32 |
| φ450 | 21 | 19 | 21 | 20 | 5.8 | 1.36 |

Fig.7D

| MEASURING POSITION | SAMPLE NO.4 | SAMPLE NO.5 |
|---|---|---|
| | CRYSTAL DIAMETER RATIO | CRYSTAL DIAMETER RATIO |
| φ0 | 1 | 1 |
| φ150 | 1.02 | 1.02 |
| φ200 | 1.06 | 1.04 |
| φ250 | 1.12 | 1.05 |
| φ300 | 1.18 | 1.07 |
| φ450 | 1.25 | 1.1 |

Fig.7E

| MEASURING POSITION | NUMBER OF CRYSTALS | | | AVERAGE NUMBER | CRYSTAL DIAMETER D(μm) | CRYSTAL DIAMETER RATIO |
|---|---|---|---|---|---|---|
| | L1 | L2 | L3 | | | |
| φ0 | 29 | 30 | 30 | 30 | 4.0 | 1.00 |
| φ150 | 28 | 27 | 30 | 28 | 4.2 | 1.05 |
| φ200 | 28 | 25 | 27 | 27 | 4.5 | 1.11 |
| φ250 | 24 | 23 | 22 | 23 | 5.2 | 1.29 |
| φ300 | 22 | 24 | 20 | 22 | 5.4 | 1.35 |
| φ450 | 25 | 28 | 25 | 26 | 4.6 | 1.14 |

Fig.9

| SAMPLE NO. | FLUORESCENCE LIFETIME |
|---|---|
| 1 | ○ |
| 2 | ○ |
| 3 | ○ |
| 4 | △ |
| 5 | △ |

RADIATION IMAGE CONVERTING PANEL

BACKGROUND OF THE INVENTION

1. Field of the Invention

The present invention relates to a radiation image converting panel comprising a radiation converting film having a columnar crystal structure, which converts an incident radiation ray to a visible light.

2. Related Background Art

Radiation images typified by X-ray images have conventionally been widely used for purposes such as disease diagnosis. As a technique for obtaining such a radiation image, for example, a radiation image recording and reproducing technique using a radiation converting film that accumulates and records irradiated radiation energy, and also emits a visible light according to radiation energy accumulated and recorded as a result of irradiating an excitation light has been widely put into practical use.

A radiation image converting panel to be applied to such a radiation image recording and reproducing technique as this includes a support body and a radiation converting film provided on the support body. As the radiation converting film, a photostimulable phosphor layer having a columnar crystal structure formed by vapor-phase growth (deposition) has been known. When the photostimulable phosphor layer has a columnar crystal structure, since a photostimulable excitation light or photostimulable emission is effectively suppressed from diffusing in the horizontal direction (reaches the support body surface while repeating reflection at crack (columnar crystal) interfaces), this allows remarkably increasing the sharpness of an image by photostimulable emission.

For example, Japanese Patent Application Laid-Open No. H02-58000 has proposed a radiation image converting panel having a photostimulable phosphor layer for which formed by a vapor-phase deposition method on a support body are slender columnar crystals with a constant tilt with respect to a normal direction of the support body. Furthermore, Japanese Patent Application Laid-Open No. 2005-98717 has proposed a technique for realizing a uniform crystal diameter distribution further excellent in impact resistance by distributing the columnar crystal diameters in a photostimulable phosphor layer isotropically from the center of the photostimulable phosphor layer toward the periphery and suppressing variation of those.

SUMMARY OF THE INVENTION

The present inventors have examined the conventional radiation image converting panels in detail, and as a result, have discovered the following problems. That is, for radiation converting films of the conventional radiation image converting panels, it has been demanded to reduce the columnar crystal diameters in order to reduce a sensitivity unevenness and obtain a higher resolution.

However, in the periphery of a radiation converting film formed on the support body, the fluorescence lifetime is shorter than that in the vicinity of the center under the influence of moisture. Therefore, there has been a problem such that, when the crystal diameters themselves of planarly distributed columnar crystals are reduced entirely and uniformly, moisture resistance in the periphery of the radiation converting film that has not been originally excellent in moisture resistance is further deteriorated.

The present invention has been developed to eliminate the problems described above. It is an object of the present invention to provide a radiation image converting panel with a structure to realize an increase in resolution of the central region of a panel and an improvement in moisture resistance of the peripheral region of the panel.

A radiation image converting panel according to the present invention comprises a support body, and a radiation converting film formed on the support body. The support body includes a parallel plate having a first main surface on which the radiation converting film is formed and a second main surface opposing the first main surface. The radiation converting film is provided on a film forming region which exists within the first main surface of the support body and includes at least a gravity center position of the first main surface. The radiation converting film is an Eu-doped photostimulable phosphor layer, and is comprised of columnar crystals which are coincident or tilted at a predetermined angle with respect to a normal direction of the first main surface.

In particular, a radiation image converting panel according to the present invention has been completed by the inventors' discovery that the crystal diameters of the columnar crystals influence moisture resistance of the panel. In concrete terms, by controlling the average crystal diameter of the columnar crystals located on a peripheral measuring area of the film forming region defined on the first main surface of the support body to 1.3 times or more larger than the average crystal diameter of the columnar crystals located on a central measuring area of the film forming region, moisture resistance in the periphery of the radiation converting film is improved. Therefore, it becomes possible to sufficiently maintain fluorescence lifetime of the radiation converting film as a whole even when the resolution in the vicinity of the center thereof is raised.

Also, each of the central measuring area and the peripheral measuring area in the film forming region is preferably an observation field of an electron microscope with a maximum width of 1 mm or less and a minimum width of 40 μm or more, and an electron-microscope observation field where five or more rows of ten or more columnar crystals exist. Moreover, in this specification, the average crystal diameter means an average of the diameters, out of the columnar crystals existing within the electron-microscope observation field, of a total of 30 or more but 1000 or less columnar crystals contained in three crystal rows each one of which is composed of ten or more columnar crystals.

The central measuring area in the film forming region preferably corresponds to the gravity center position of the first main surface in the support body, but may be around the gravity center position. More specifically, it suffices that the central measuring area is located in an area (central area) of the film forming region where a distance from the gravity center position equals 5% of the minimum distance from the gravity center position to an edge of the film forming region. On the other hand, the peripheral measuring area in the film forming region locates at a position where a distance from the gravity center position equals 60% of the minimum distance from the gravity center position. However, it also suffices that the peripheral measuring area is located in an area (peripheral area) sandwiched by the edge of the film forming region and the circumference of a circle around the gravity center position whose radius equals 60% of the minimum distance from the gravity center position to the edge of the film forming region.

Moreover, the central measuring area in the film forming region may be located in a central area of the film forming region defined by a circle around the gravity center position whose area ratio equals 0.05 or less to the total area of the film forming region. In this case, the peripheral measuring area in the film forming region may be located in a peripheral area of the film forming region sandwiched by the edge of the film forming region and the circumference of a circle around the gravity center position whose area ratio equals 0.36 to the total area of the film forming region.

Ideally, the average crystal diameter in one measuring area or each one of more than one measuring areas located on a line segment connecting the central measuring area and the peripheral measuring area monotonically increases from the central measuring area toward the peripheral measuring area. At the very least, the average crystal diameter in the measuring area located at a middle point of a line segment connecting the central measuring area and the peripheral measuring area is larger than the average crystal diameter in the central measuring area and smaller than the average crystal diameter in the peripheral measuring area.

In the radiation image converting panel according to the present invention, the average crystal diameter of the columnar crystals located on the peripheral measuring area of the film forming region is preferably 2.5 times or less larger than the average crystal diameter of the columnar crystals located on the central measuring area of the film forming region. This is because when the crystal diameter ratio greatly exceeds 2.5 times, a difference in resolution between the central measuring area and the peripheral measuring area becomes excessively large, an image unevenness and a sensitivity unevenness on the panel surface become significant. More preferably, the average crystal diameter of the columnar crystals located on the peripheral measuring area of the film forming region is 2.0 times or less larger than the average crystal diameter of the columnar crystals located on the central measuring area of the film forming region, and further preferably, 1.6 times or less.

Furthermore, the radiation image converting panel according to the present invention may include a moisture-resistant protective film (transparent organic film) that covers an exposed surface of the radiation converting film without a surface covered by the first main surface of the support body (the surface attached on the first main surface).

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the scope of the invention will be apparent to those skilled in the art from this detailed description.

BRIEF DESCRIPTION OF THE DRAWINGS

FIG. 6 is a table for explaining a relationship between the measuring position of an average crystal diameter and the distance from the gravity center position;

FIGS. 7A to 7E are tables of specifications summarized, with regard to samples prepared as radiation image converting panels according to the present invention and samples prepared as radiation image converting panels according to comparative examples;

FIG. 9 is a table showing, with regard to the prepared radiation image converting panels (radiation converting films) of Samples No. 1 to No. 5, evaluation results of fluorescence lifetimes thereof.

DESCRIPTION OF THE PREFERRED EMBODIMENTS

Figures 1A, 1B, 1C:
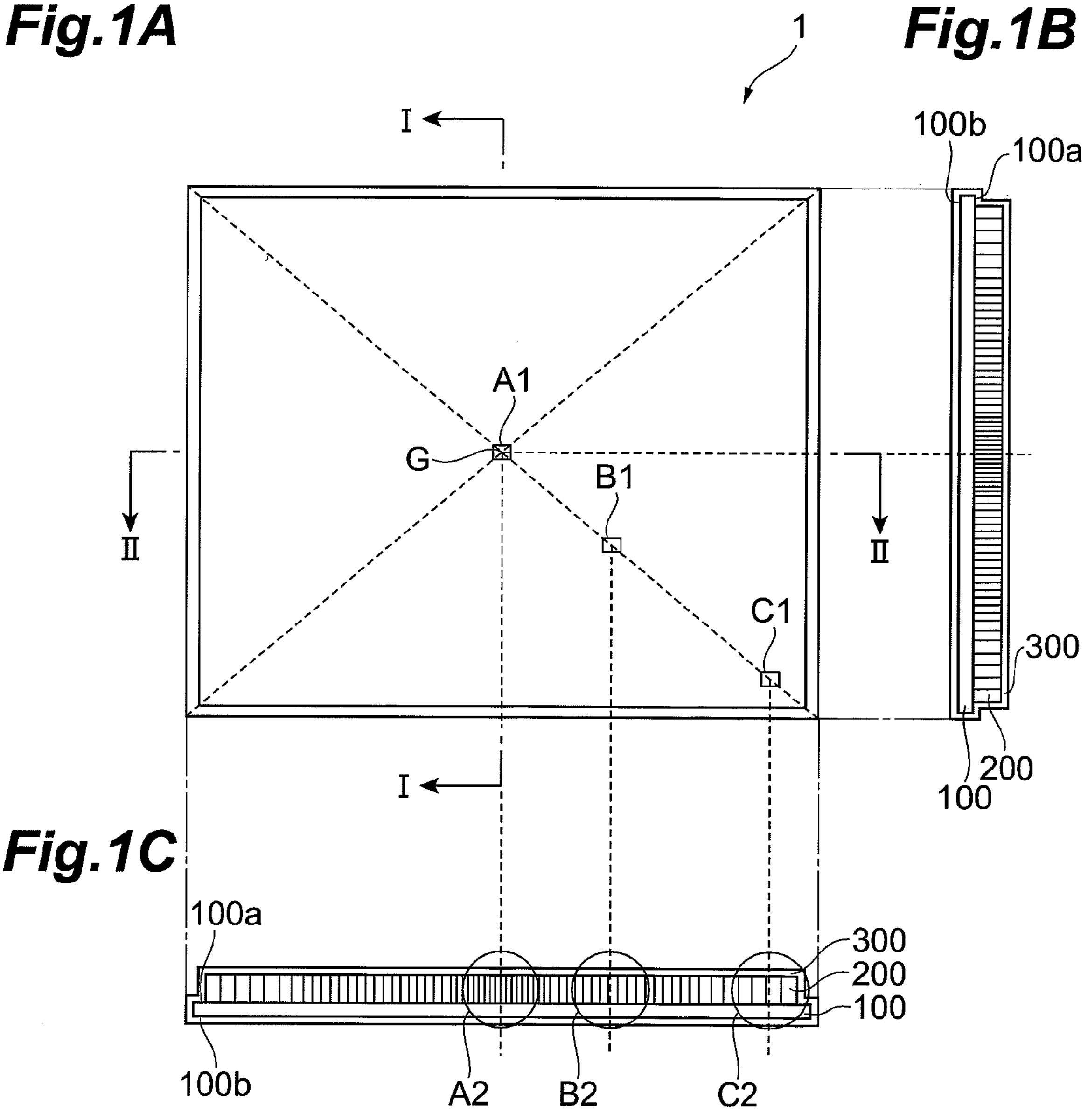
FIGS. 1A to 1C are views showing a structure of an embodiment of a radiation image converting panel according to the present invention.

In the following, embodiments of a radiation image converting panel according to the present invention will be explained in detail with reference to FIGS. 1A to 3B, 4 to 6, 7A to 7E, and 8 to 9. In the description of the drawings, identical or corresponding components are designated by the same reference numerals, and overlapping description is omitted.

FIGS. 1A to 1C are views showing a structure of an embodiment of a radiation image converting panel according to the present invention. In particular, FIG. 1A is a plan view of the radiation image converting panel 1, FIG. 1B is a sectional view of the radiation image converting panel 1 along the line I-I in FIG. 1A, and FIG. 1C is a sectional view of the radiation image converting panel 1 along the line II-II in FIG. 1A.

In FIGS. 1A to 1C, the radiation image converting panel 1 comprises a support body 100, a radiation converting film 200 formed on the support body 100, and a protective film 300 (transparent organic film) that wholly covers the support body 100 and the radiation converting film 200. The support body 100 is a parallel plate having a first main surface 100*a* on which the radiation converting film 200 is formed and a second main surface 100*b* opposing the first main surface 100*a*. The radiation converting film 200 is formed on a film forming region R. The film forming region R exists within the first main surface 100*a* of the support body 100 and includes at least a gravity center position G of the first main surface 100*a*. This radiation converting film 200 is comprised of columnar crystals which are coincident or tilted at a predetermined angle with respect to a normal direction of the first main surface 100*a*.

Figure 2A:
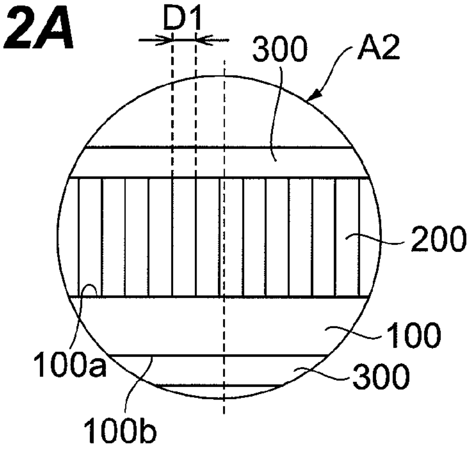
FIGS. 2A to 2F are views showing sectional structures of respective parts and electron micrographs in a radiation converting film of a radiation image converting panel according to the present invention.
Figure 2D:
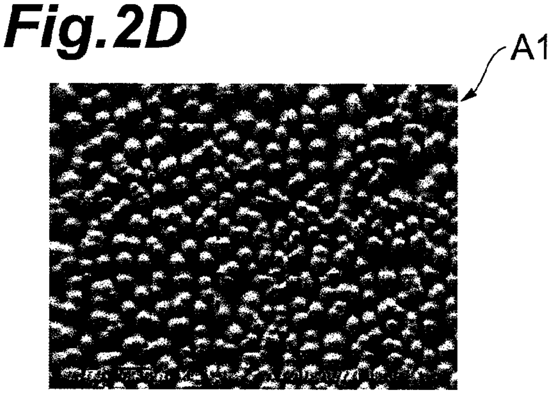
Figure 2B:
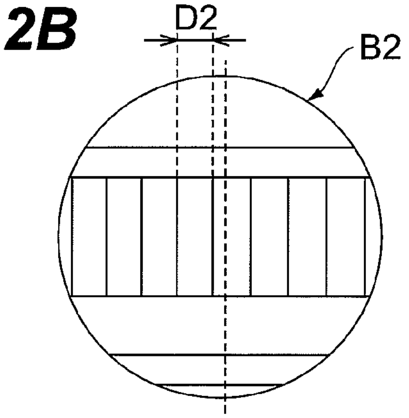
Figure 2E:
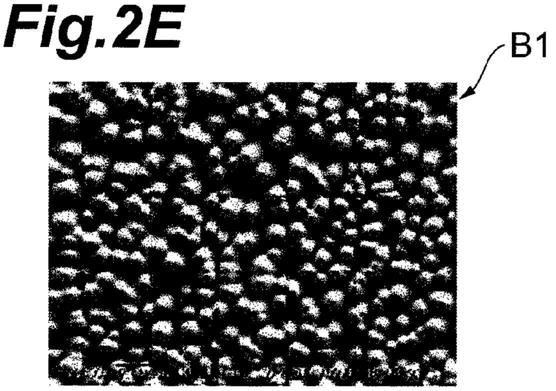
Figure 2C:
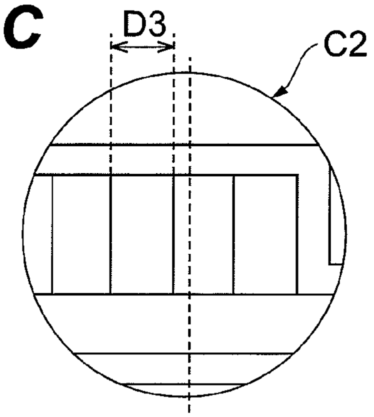
Figure 2F:
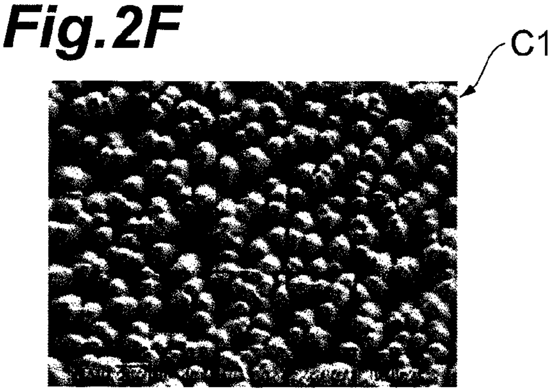

FIGS. 2A to 2F are views showing sectional structures of respective parts and electron micrographs in a radiation converting film of the radiation image converting film according to the present invention. In concrete terms, FIG. 2A is a sectional view of a region A2 in FIG. 1C, FIG. 2B is a sectional view of a region B2 in FIG. 1C, and FIG. 2C is a sectional view of a region C2 in FIG. 1C. In addition, FIG. 2D is a plan-view micrograph of a region A1 in FIG. 1B, FIG. 2E is a plan-view micrograph of a region B1 in FIG. 1B, and FIG. 2F is a plan-view micrograph of a region C1 in FIG. 1B.

As can be understood from FIGS. 2A to 2F, the crystal diameters of columnar crystals that form the radiation converting film 200 are gradually enlarged from the vicinity of the center of the radiation converting film 200 toward the periphery thereof. In concrete terms, the average crystal diameter of the columnar crystals located on a peripheral measuring area of the film forming region R defined on the first main surface 100 is 1.3 times or more larger than the average crystal diameter of the columnar crystals located on a central measuring area corresponding to the gravity center position G of the film forming region R. By thus providing the crystal diameters of the columnar crystals in the periphery of the radiation converting film 200 larger than those in the vicinity of the center thereof, moisture resistance in the periphery of the radiation converting film 200 is improved, so that a sufficient fluorescence lifetime of the panel as a whole can be maintained.

In concrete terms, the columnar crystals shown in FIGS. 2A and 2D have a crystal diameter W1 of approximately 4 μm. The columnar crystals shown in FIGS. 2B and 2E have a crystal diameter W2 of approximately 6 μm. The columnar crystals shown in FIGS. 2C and 2F have a crystal diameter W3 of approximately 10 μm (a crystal diameter ratio to W1 is 2.5 times). However, the average crystal diameter of the columnar crystals located on the peripheral measuring area of the film forming region R is preferably 2.5 times or less larger than the average crystal diameter of the columnar crystals located on the central measuring area of the film forming region R. More preferably, the average crystal diameter of the columnar crystals located on the peripheral measuring area of the film forming region R is 2.0 times or less larger than the average crystal diameter of the columnar crystals located on the central measuring area of the film forming region R, and further preferably, 1.6 times or less. This is because when a difference in resolution between the vicinity of the center and periphery of the radiation converting film 200 thus becomes excessively large due to the crystal diameter ratio, an image unevenness and a sensitivity unevenness on the panel surface become significant.

Figure 3A:
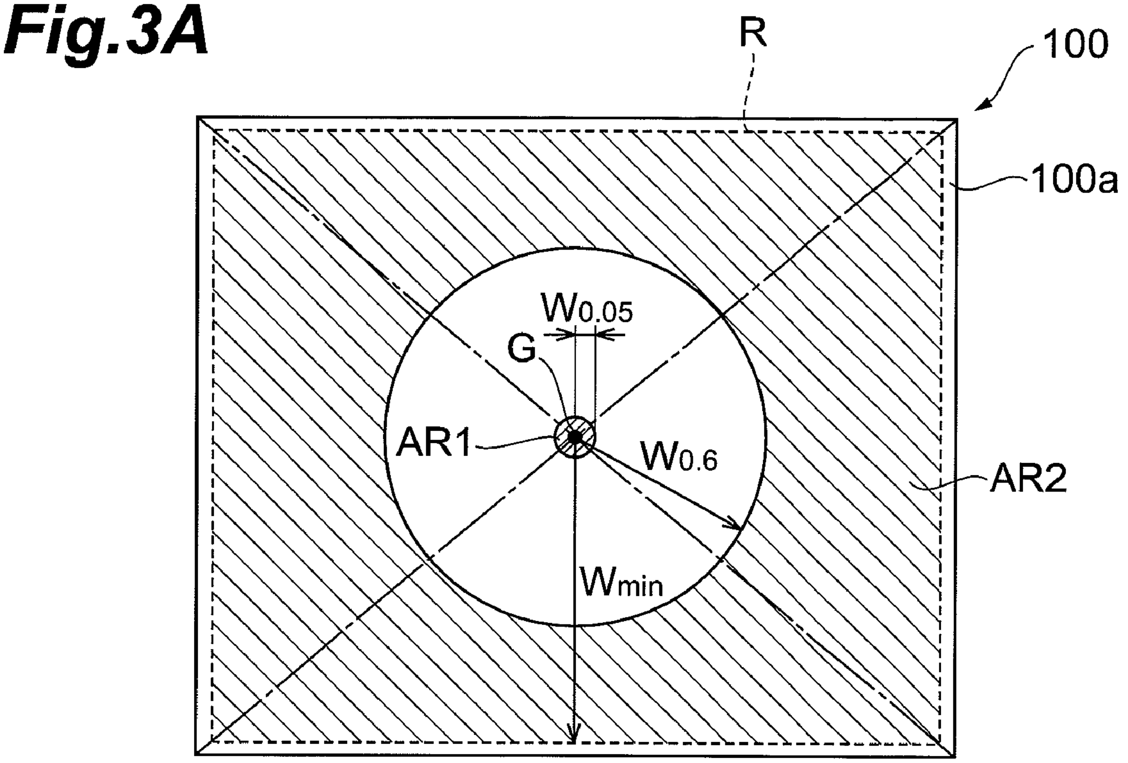
FIGS. 3A and 3B are views for concretely explaining a method for specifying a central measuring area and a peripheral measuring area on the first main surface of a support body.
Figure 3B:
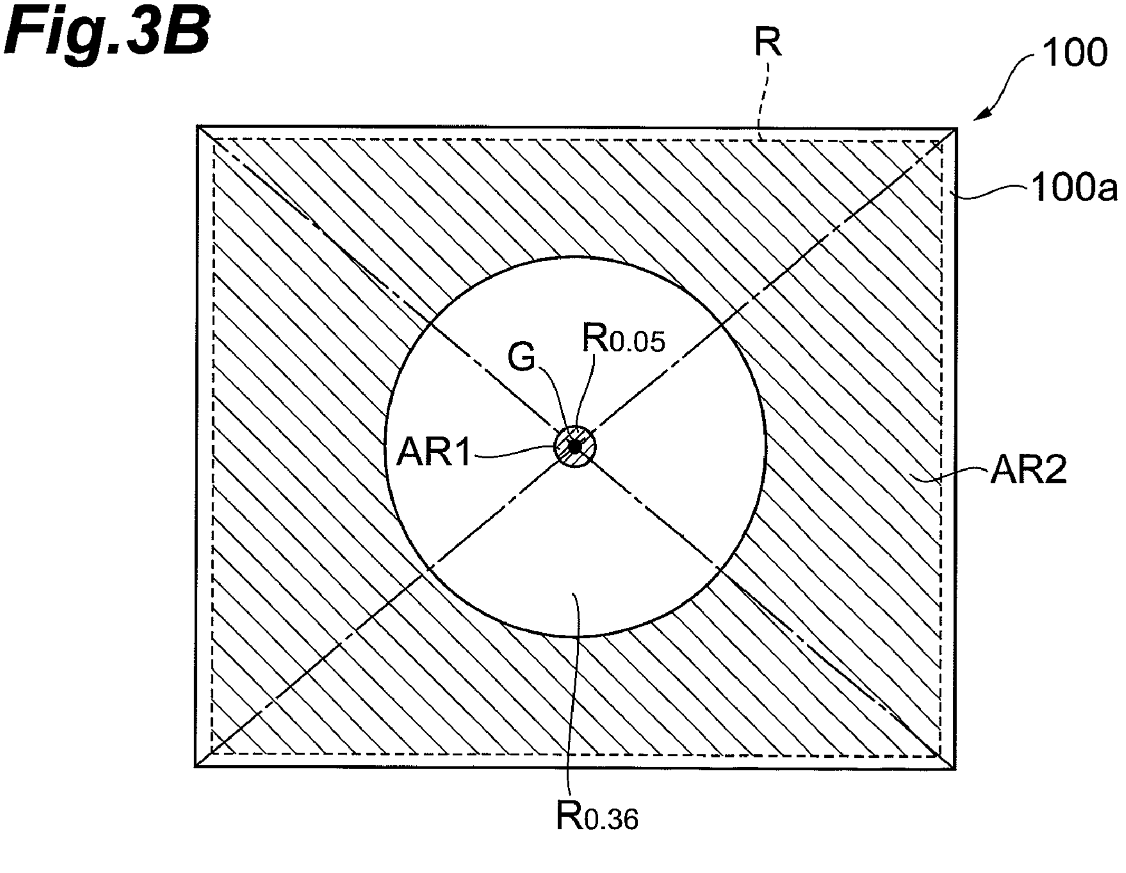

Next, by use of FIGS. 3A and 3B, description will be given of a central measuring area and a peripheral measuring area where the average crystal diameters are compared. FIGS. 3A and 3B are views for concretely explaining a method for specifying a central measuring area and a peripheral measuring area on the first main surface 100*a* of the support body 100.

As shown in FIGS. 3A and 3B, the concrete specifying method includes two types. First, according to the first specifying method, as shown in FIG. 3A, a central measuring area in the film forming region R corresponds to the gravity center position G of the first main surface 100*a* in the support body 100. On the other hand, a peripheral measuring area in the film forming region R located at a position where a distance from the gravity center position G equals 60% of the minimum distance from the gravity center position G to an edge of the film forming region R (on the circumference of a circle around the gravity center position G whose radius equals 60% of the minimum distance).

Also, in the first specifying method of FIG. 3A as well, a central measuring area in the film forming region R may be around the gravity center position G of the first main surface 100*a* in the support body 100. More specifically, it suffices that the central measuring area is located in a central area AR1 of the film forming region R where a distance from the gravity center position G equals 5% of the minimum distance from the gravity center position G to an edge of the film forming region R (inside a circle around the gravity center position G whose radius equals 5% of the minimum distance). On the other hand, it suffices that the peripheral measuring area is located in an area AR2 sandwiched by the edge of the film forming region R and the circumference of a circle around the gravity center position G whose radius equals 60% of the minimum distance.

Moreover, in the second specifying method of FIG. 3B as well, it suffices that a central measuring area in the film forming region R is at the gravity center position G, but this may be around the gravity center position G. In concrete terms, the central measuring area may be located in an area AR1 (central area) defined by a circle around the gravity center position G whose area ratio equals 0.05 to the total area of the film forming region R. On the other hand, the peripheral measuring area in the film forming region R may be located in a peripheral area AR2 of the film forming region R sandwiched by the edge of the film forming region R and the circumference of a circle around the gravity center position G whose area ratio equals 0.36 to the total area of the film forming region R.

In either of the specifying methods of FIGS. 3A and 3B, a measuring area having the smallest average crystal diameter exists in the central area AR1 of the film forming region R.

Figure 4:
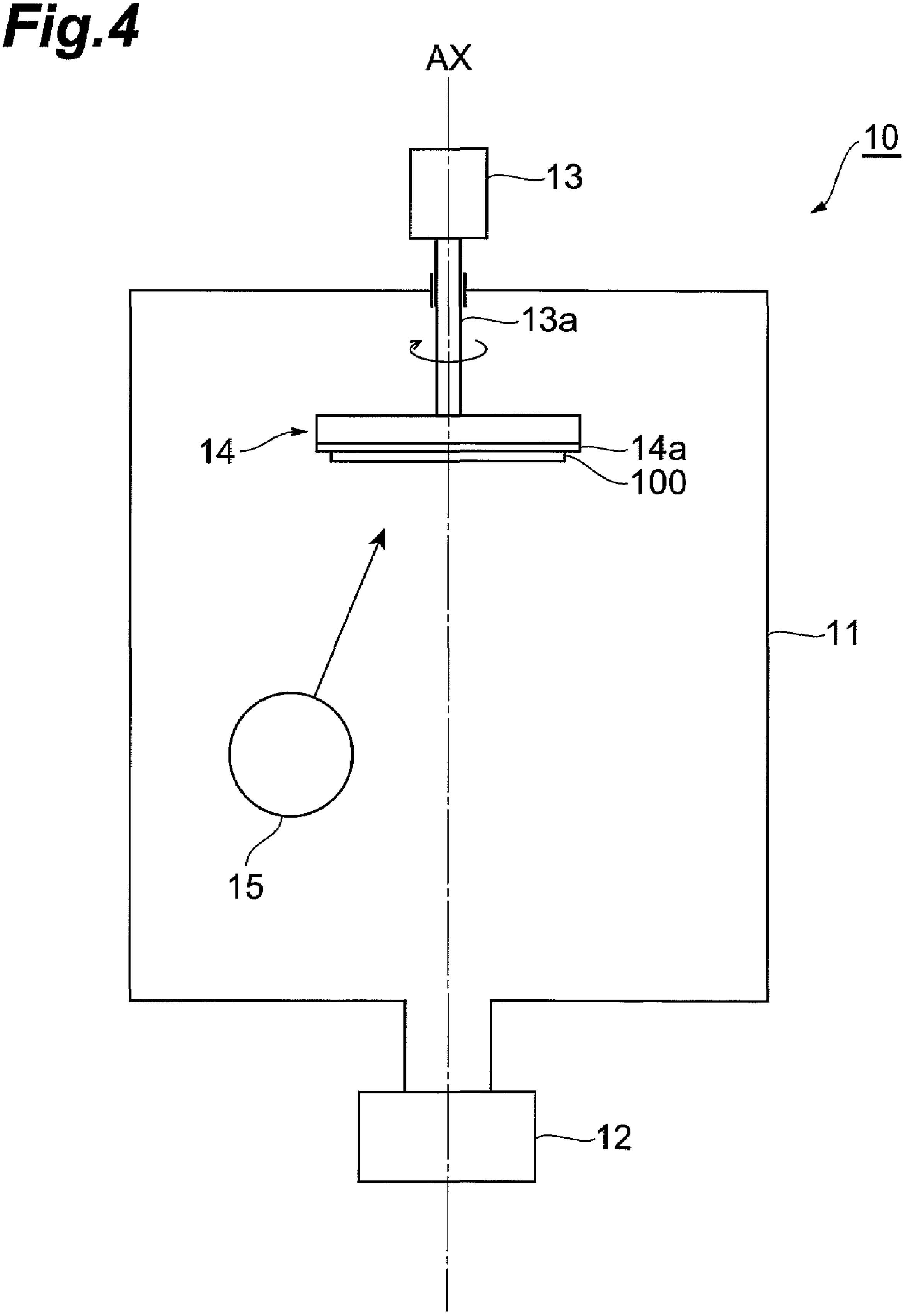
FIG. 4 is a view showing a configuration of a manufacturing apparatus for forming a radiation converting film on a support body, as a part of the manufacturing process of a radiation image converting panel according to the present invention.

Next, FIG. 4 is a view showing a configuration of a manufacturing apparatus for forming on a support body a radiation converting film of a radiation image converting panel according to the present invention.

The manufacturing apparatus 10 shown in FIG. 4 is an apparatus that forms a radiation converting film 200 on the first main surface 100*a* of the support body 100 by a vapor-phase deposition method. As the vapor-phase deposition method, a vapor deposition method, a sputtering method, a CVD method, an ion plating method, or the like is applicable, and description will be given for, as an example, a case where the radiation converting film 200 of Eu-doped CsBr is formed on the support body 100 by a vapor deposition method. This manufacturing apparatus 10 comprises, at least, a vacuum container 11, a support body holder 14, a rotary shaft 13*a*, a drive unit 13, an evaporation source 15, and a vacuum pump 12. The support body holder 14, the evaporation source 15, and a part of the rotary shaft 13*a* are arranged in the vacuum container 11. The support body holder 14 includes a heater 14*a* to heat the support body 100. One end of the rotary shaft 13*a* extended from the drive unit 13 is attached to the support body holder 14, and the drive unit 13 rotates the support body holder 14 via the rotary shaft 13*a*. The evaporation source 15, which is arranged at a position deviated from a center axis AX of the vacuum container 11, holds a metal material supplied as a metal vapor to be vapor-deposited on the support body 100 installed on the support body holder 14. The vacuum pump 12 depressurizes the interior of the vacuum container 11 to a predetermined degree of vacuum.

In the evaporation source 15, a mixture material of CsBr and EuBr is set, and the support body 100 is set on the support body holder 14. The crystal diameter of columnar crystals to be formed on a surface of the support body 100 facing the evaporation source 15 is adjusted by adjusting the temperature of the support body 100 itself with the heater 14*a*, and by controlling the degree of vacuum in the vacuum container 11, an inflow angle of the metal vapor from the material source 15 to the support body 100, and the like.

First, columnar crystals of Eu-doped CsBr are grown on the first main surface 100*a* (the surface facing the evaporation source 15) of the support body 100 by a vapor deposition method. At this time, the drive unit 13 is rotating the support body holder 14 via the rotary shaft 13*a*, and accordingly, the support body 100 is also rotating around the axis AX.

By such a vapor deposition method, a radiation converting film 200 with a film thickness of 500 μm±50 μm is formed on the support body 100. At this time, the crystal diameter of columnar crystals in the vicinity of the center (a local region around the axis AX) of the radiation converting film 200 is approximately 4 μm. Moreover, the crystal diameter of columnar crystals in the periphery of the radiation converting film 200 is approximately 10 μm (see FIGS. 2A to 2F).

The CsBr being a material of the radiation converting film 200 formed on the support body 100 as described above is highly hygroscopic. The radiation converting film 200 absorbs vapor in the air to deliquesce when this is kept exposed. Therefore, subsequent to the forming step of the radiation converting film 200 by a vapor deposition method, a moisture-resistant protective film 300 is formed by a CVD method so as to cover an entire exposed surface of the radiation converting film 200. More specifically, the support body 100 on which the radiation converting film 200 has been formed is placed in a CVD apparatus, and a moisture-resistant protective film 300 with a film thickness of approximately 10 μm is formed on the exposed surface of the radiation converting film 200. Thereby, the radiation image converting panel 1 for which the moisture-resistant protective film 300 has been formed on the radiation converting film 200 and the support body 100 is obtained.

Figure 5:
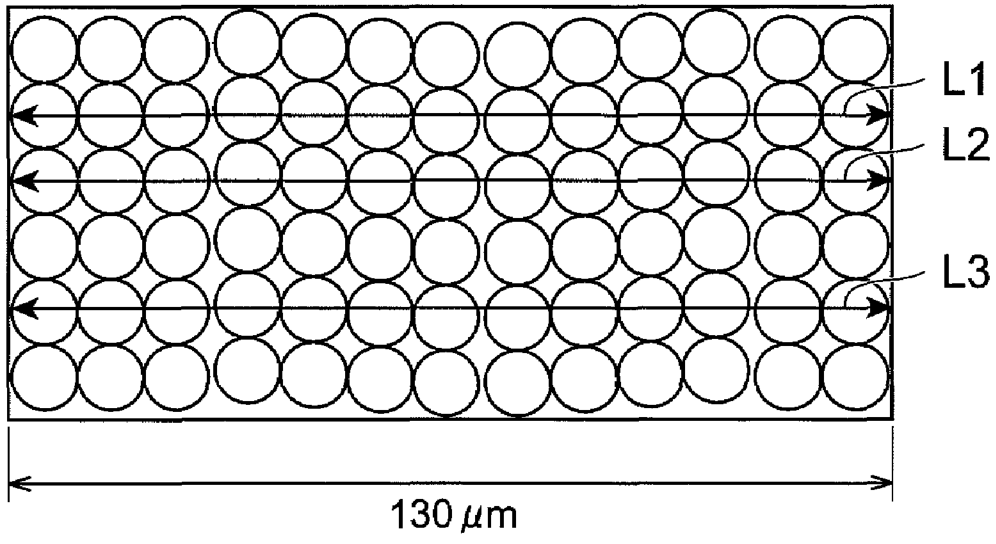
FIG. 5 is a view for explaining a measuring method of an average crystal diameter.

Next, description will be given of a measuring method of an average crystal diameter in a sample of the radiation image converting panel 1 obtained by a vapor deposition method and a CVD method as described above. FIG. 5 is a view for explaining the measuring method of an average crystal diameter. In addition, FIG. 6 is a table for explaining a relationship between the measuring position of an average crystal diameter and the distance from the gravity center position G.

A measuring area in the film forming region R defined on the first main surface 100*a* of the support body 100 is, as shown in FIG. 5, an observation field of an electron microscope with a maximum width of 1 mm or less and a minimum width of 40 μm or more, and from an electron-microscope observation field of a columnar crystal group where five or more rows of ten or more columnar crystals exist, an average crystal diameter of columnar crystals located on the measuring area is calculated.

In concrete terms, when an electron micrograph of a columnar crystal group located on a measuring area of such a size as described above is obtained, three parallel lines L1 to L3 as shown in FIG. 5 are then drawn on the obtained electron micrograph. For each of the lines L1 to L3, the numbers of columnar crystals through which these lines L1 to L3 pass are counted, respectively, to determine an average number of crystals per one line. Subsequently, the length of the lines L1 to L3 is divided by the determined average number of crystals, whereby an average crystal diameter in one measuring area is obtained.

Moreover, in FIG. 6, a measuring position ϕ0 indicates the gravity center position G (=$W_0$) (a distance W from the gravity center position G is 0% to a minimum distance $W_{min}$ from the gravity center position G to the edge of the film forming region R). A measuring position ϕ150 indicates that the distance W from the gravity center position G is 30% (=$W_{0.3}$) to the minimum distance $W_{min}$ from the gravity center position G to the edge of the film forming region R, a measuring position ϕ200 indicates that the distance W from the gravity center position G is 40% (=$W_{0.4}$) to the minimum distance $W_{min}$ from the gravity center position G to the edge of the film forming region R, a measuring position ϕ250 indicates that the distance W from the gravity center position G is 50% (=$W_{0.5}$) to the minimum distance $W_{min}$ from the gravity center position G to the edge of the film forming region R, a measuring position ϕ300 indicates that the distance W from the gravity center position G is 60% (=$W_{0.6}$) to the minimum distance $W_{min}$ from the gravity center position G to the edge of the film forming region R, and a measuring position ϕ450 indicates that the distance W from the gravity center position G is 90% (=$W_{0.9}$) to the minimum distance $W_{min}$ from the gravity center position G to the edge of the film forming region R.

FIGS. 7A to 7E are tables of specifications summarized, with regard to samples (Samples No. 1 to No. 3) prepared as radiation image converting panels according to the present invention and samples (Samples No. 4 to No. 5) prepared as radiation image converting panels according to comparative examples.

In FIGS. 7A to 7C and 7E, shown are the number of sampling crystals, the average number, the average crystal diameter D (which is simply inscribed as a crystal diameter in FIGS. 7A to 7C and 7E), and the crystal diameter ratio in the measuring area according to measuring positions (ϕ0 to ϕ450), with regard to a radiation converting film of each of Samples No. 1 to No. 3. Here, the number of sampling crystals shows the number of crystals through which each of the lines L1 to L3 drawn on the obtained electron micrograph passes, as shown in FIG. 5. The average number shows an average of the numbers of crystals through which the lines L1 to L3 pass, respectively. The average crystal diameter D shows a value obtained by dividing the length of the lines L1 to L3 by the average number of crystals. The crystal diameter ratio is a ratio of the average crystal diameter at each measuring position when the average crystal diameter at the measuring position ϕ0 is provided as 1.

Also, in FIG. 7D, shown is the crystal diameter ratio in the measuring area according to measuring positions (ϕ0 to ϕ450), with regard to a radiation converting film of each of Samples No. 4 and No. 5.

In all the radiation converting films of Samples No. 1 to No. 3, the average crystal diameter ratio of the measuring area at the measuring position ϕ300 was 1.3 or more to the average crystal diameter of the measuring area at the measuring position ϕ0. Moreover, also in a peripheral area (including the measuring position ϕ450) separated from the gravity center position G further than the measuring position ϕ300, the average crystal diameter ratio of the measuring area was 1.3 or more. However, regarding the sample of FIG. 7E which belongs in the category of Sample No. 1 or No. 2, the average crystal diameter ratio of the measuring area at the measuring position ϕ300 has reached 1.3 or more, while the average crystal diameter ratio of the measuring area at the measuring position ϕ450 has greatly fallen below 1.3. When the radiation converting film is used as a large-area panel, thus, in a region located at the outermost position, even a reduction in fluorescence lifetime does not cause a practical problem.

On the other hand, in the radiation converting films of Samples No. 4 and No. 5 of comparative examples, the average crystal diameter ratio has greatly fallen below 1.3 at all measuring positions ϕ0 to ϕ450.

Figure 8:
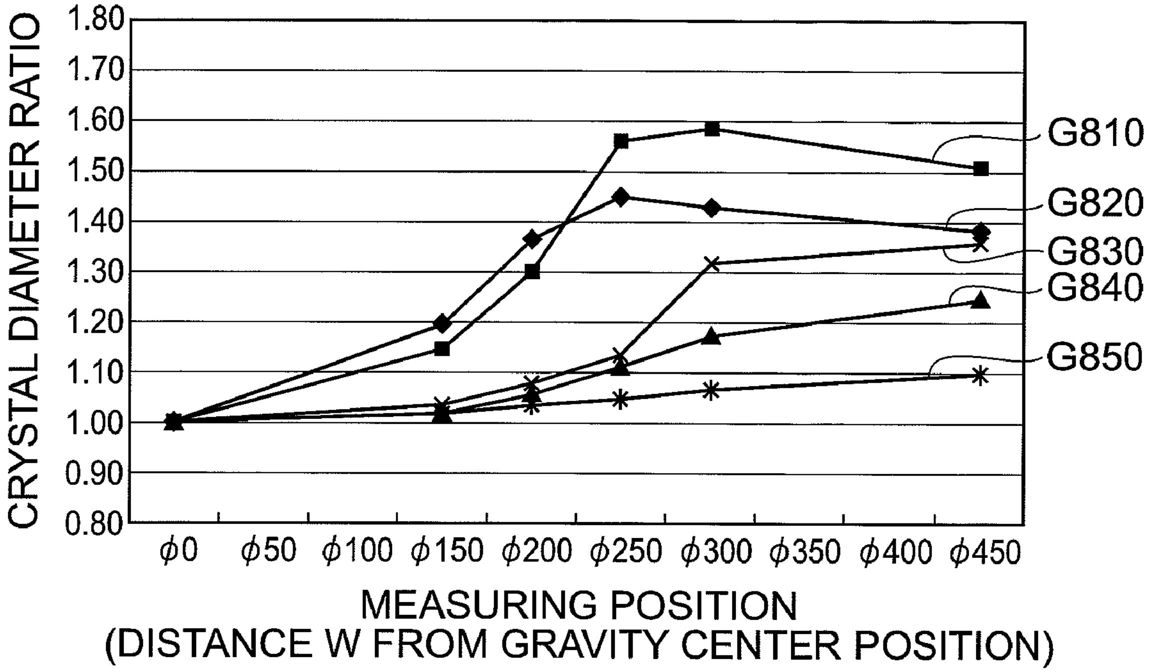
FIG. 8 is a graph showing relationships between the measuring position and the average crystal diameter ratio, with regard to prepared radiation image converting panels (radiation converting films) of Samples No. 1 to No. 5.

FIG. 8 is a graph showing relationships between the measuring position and the average crystal diameter ratio (simply inscribed as a crystal diameter ratio in FIG. 8), with regard to radiation converting films of Samples No. 1 to No. 5 having crystal diameter distributions as described above. Also in FIG. 8, graph G810 shows a distance distribution of the average crystal diameter ratios of Sample No. 2, graph G820 shows a distance distribution of the average crystal diameter ratios of Sample No. 1, graph G830 shows a distance distribution of the average crystal diameter ratios of Sample No. 3, graph G840 shows a distance distribution of the average crystal diameter ratios of Sample No. 4 according to a comparative example, and graph G850 shows a distance distribution of the average crystal diameter ratios of Sample No. 5 according to a comparative example.

Moreover, FIG. 9 is a table showing, with regard to the prepared radiation converting films of Samples No. 1 to No. 5, evaluation results of fluorescence lifetimes thereof. The concrete fluorescence lifetime evaluations were performed by measuring the luminance values of samples used for one month (720 hours) under an environment with a temperature of 25° C. and a humidity of 50%. In this case, a sample whose measured luminance value has been maintained at 80% or more to the initial luminance value is shown with an evaluation ○, and a sample whose luminance value is practically acceptable even at 80% or less, with an evaluation Δ, and a sample whose luminance value has been lowered to a practically unacceptable extent, with an evaluation x.

In the radiation converting films of Samples No. 1 to No. 3, the average crystal diameter ratio of the measuring area at the measuring position ϕ300 ($=W_{0.6}$) was 1.3 or more, and deterioration in fluorescence lifetime in the periphery of the radiation converting film has not been recognized in any sample. On the contrary, in the radiation converting films of Samples No. 4 and No. 5 according to comparative examples, the average crystal diameter ratio of the measuring area at the measuring position ϕ300 ($=W_{0.6}$) has greatly fallen below 1.3, and deterioration in fluorescence lifetime in the periphery of the radiation converting film has been recognized in both samples. Thus controlling the average crystal diameter of columnar crystals located on the peripheral measuring area (measuring area at measuring position ϕ300) of the film forming region R defined on the first main surface 100*a* of the support body 100 to 1.3 times or more larger than the average crystal diameter of columnar crystals located on the central measuring area (measuring area at the measuring position ϕ0) makes it possible to improve moisture resistance of the radiation image converting panel.

Also, as can be understood from FIG. 8, the average crystal diameter in the measuring area located at a middle point (measuring position ϕ150) of a line segment connecting the measuring position ϕ0 corresponding to the gravity center position G and the measuring position ϕ300 is larger than the average crystal diameter in the measuring area at the measuring position ϕ0, and smaller than the average crystal diameter in the measuring area at the measuring position ϕ300. Ideally, it is preferable that the average crystal diameter in one measuring area or each one of more than one measuring areas located on a line segment connecting the measuring position ϕ0 and the measuring position ϕ250 (or ϕ300) monotonically increases. Moreover, it is preferable that a measuring area where the average crystal diameter is maximized is located between the measuring positions ϕ200 ($=W_{0.4}$) to ϕ400 ($=W_{0.8}$).

On the other hand, it is preferable that the average crystal diameter of columnar crystals located on the peripheral measuring area (measuring area at the measuring position ϕ300) of the film forming region R is 2.5 times or less larger than the average crystal diameter of columnar crystals located on the central measuring area (measuring area at the measuring position ϕ0) of the film forming region R. This is because when the crystal diameter ratio becomes excessively large, a difference in resolution between the vicinity of the center and periphery of the radiation converting film becomes excessively large, and an image unevenness and a sensitivity unevenness on the panel surface become significant.

As has been described above, a radiation converting film is formed on a film forming region of the support body so that the crystal diameters of columnar crystals are larger in the peripheral area than the central area of the film forming area. Therefore, moisture resistance in the periphery of the radiation image converting panel is improved even when the resolution in the vicinity of the center thereof is increased, so that a sufficient fluorescence lifetime of the panel as a whole is maintained.

From the invention thus described, it will be obvious that the embodiments of the invention may be varied in many ways. Such variations are not to be regarded as a departure from the scope of the invention, and all such modifications as would be obvious to one skilled in the art are intended for inclusion within the scope of the following claims.

What is claimed is:

1. A radiation image converting panel comprising:

a support body having a first main surface and a second main surface opposing said first main surface; and a radiation converting film provided on a film forming region which exists within said first main surface of said support body and includes at least a gravity center position of said first main surface, said radiation converting film being comprised of columnar crystals which are coincident or tilted at a predetermined angle with respect to a normal direction of said first main surface, wherein, in said film forming region of said first main surface, an average crystal diameter of the columnar crystals located on a peripheral measuring area that has a maximum width of 1 mm or less is 1.3 times or more larger than an average crystal diameter of the columnar crystals located on a central measuring area that includes the gravity center position and has a maximum width of 1 mm or less, said peripheral measuring area locating at a position where a distance from the gravity center position is 60% of a minimum distance from the gravity center position to an edge of said film forming region.

2. A radiation image converting panel according to claim 1, wherein an average crystal diameter in a measuring area having a maximum width of 1 mm or less, located at a middle position of a line segment connecting said central measuring area and said peripheral measuring area, is larger than an average crystal diameter in said central measuring area and smaller than an average crystal diameter in said peripheral measuring area.

3. A radiation image converting panel according to claim 1, wherein each of said central measuring area and said peripheral measuring area is an observation field of an electron microscope where five or more rows of ten or more columnar crystals exist.

4. A radiation image converting panel according to claim 1, wherein an average crystal diameter of the columnar crystals located on said peripheral measuring area is 2.5 times or less larger than an average crystal diameter of the columnar crystals located on said central measuring area.

5. A radiation image converting panel according to claim 4, wherein an average crystal diameter of the columnar crystals located on said peripheral measuring area is 2.0 times or less larger than an average crystal diameter of the columnar crystals located on said central measuring area.

6. A radiation image converting panel according to claim 1, further comprising a protective film that covers an exposed surface of said radiation converting film excluding a surface covered by said first main surface of said support body.

7. A radiation image converting panel comprising:

a support body having a first main surface and a second main surface opposing the first main surface; and a radiation converting film provided on a film forming region which exists within said first main surface of said support body and includes at least a gravity center position of said first main surface, said radiation converting film being comprised of columnar crystals which are coincident or tilted at a predetermined angle with respect to a normal direction of said first main surface, wherein, in said film forming region of said first main surface, an average crystal diameter of the columnar crystals located on a peripheral measuring area that has a maximum width of 1 mm or less is 1.3 times or more larger than an average crystal diameter of the columnar crystals located on a central measuring area which includes the gravity center position and has a maximum width of 1 mm or less, said peripheral measuring area being located on a circumference of a circle around the gravity center position whose area ratio to a total area of said film forming region of said first main surface equals 0.36.

8. A radiation image converting panel according to claim 7, wherein an average crystal diameter in a measuring area with a maximum width of 1 mm or less, located at a middle position of a line segment connecting said central measuring area and said peripheral measuring area, is larger than an average crystal diameter in said central measuring area and smaller than an average crystal diameter in said peripheral measuring area.

9. A radiation image converting panel according to claim 7, wherein each of said central measuring area and said peripheral measuring area is an observation field of an electron microscope where five or more rows of ten or more columnar crystals exist.

10. A radiation image converting panel according to claim 7, wherein an average crystal diameter of the columnar crystals located on said peripheral measuring area is 2.5 times or less larger than an average crystal diameter of the columnar crystals located on said central measuring area.

11. A radiation image converting panel according to claim 10, wherein an average crystal diameter of the columnar crystals located on said peripheral measuring area is 2.0 times or less larger than an average crystal diameter of the columnar crystals located on said central measuring area.

12. A radiation image converting panel according to claim 7, further comprising a protective film that covers an exposed surface of said radiation converting film excluding a surface covered by said first main surface of said support body.

* * * * *